Figure 1:
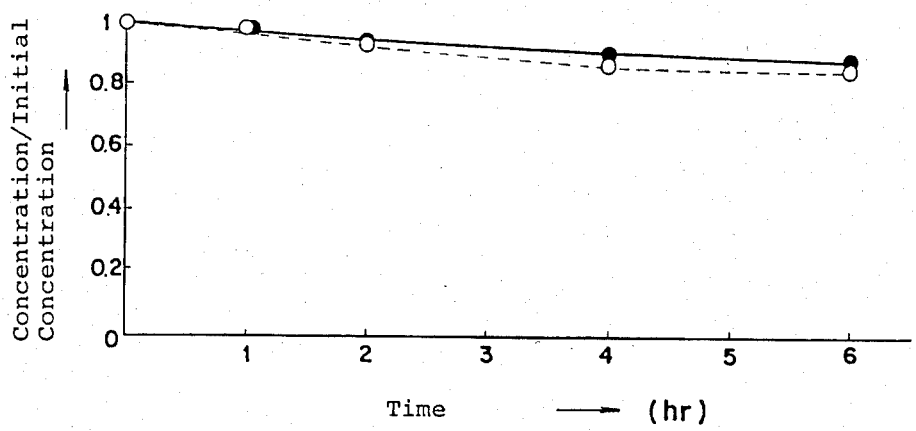

United States Patent [19]

Nakagawa et al.

[11] Patent Number: 4,499,249

[45] Date of Patent: Feb. 12, 1985

[54] PROCESS FOR PREPARING TETRAFLUOROETHYLENE/FLUORO(ALKYL VINYL ETHER) COPOLYMER

[75] Inventors: Shinichi Nakagawa, Nara; Tsuneo Nakagawa, Osaka; Sadaatsu Yamaguchi, Osaka; Kiyohiko Ihara, Osaka; Toshihiko Amano, Osaka; Mitsugu Omori, Osaka; Kohzoh Asano, Osaka, all of Japan

[73] Assignee: Daikin Kogyo Co., Ltd., Osaka, Japan

[21] Appl. No.: 489,289

[22] Filed: Apr. 28, 1983

[30] Foreign Application Priority Data

Apr. 30, 1982 [JP] Japan ................... 57-73671

[51] Int. Cl.³ ............................................ C08F 214/26
[52] U.S. Cl. ..................... 526/206; 526/231; 526/247
[58] Field of Search ................. 526/247, 206, 231

[56] References Cited

U.S. PATENT DOCUMENTS 2,684,959  7/1954  Rearick .................. 526/231
2,877,217  3/1959  Thompson et al. ......... 526/231
3,528,954  9/1970  Carlson .................. 526/247
3,642,742  2/1972  Carlson .................. 526/231
3,671,510  6/1972  Kometani et al. .......... 526/231
4,078,135  3/1978  Sulzbach et al. .......... 526/247
4,262,101  4/1981  Hartwimmer et al. ........ 526/247

Primary Examiner—Harry Wong, Jr.
Attorney, Agent, or Firm—Birch, Stewart, Kolasch & Birch

[57] ABSTRACT

A process for preparing a tetrafluoroethylene/fluoro(alkyl vinyl ether) copolymer comprising polymerizing tetrafluoroethylene and fluoro(alkyl vinyl ether) in an aqueous suspension system which comprises a mixed medium of water and a fluorohydrocarbon or a chlorofluorohydrocarbon in a volume ratio of from 1:1 to 10:1 at a temperature of from 0° to 25° C. in the presence of a polymerization initiator of the formula:

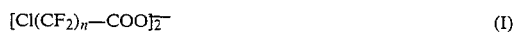

$$[Cl(CF_2)_n-COO]_2^- \quad (I)$$

wherein n is an integer of 1 to 10, the copolymer obtained by the process having a small number of unstable terminal groups and excellent flex life.

10 Claims, 2 Drawing Figures

PROCESS FOR PREPARING TETRAFLUOROETHYLENE/FLUORO(ALKYL VINYL ETHER) COPOLYMER

This invention relates to a process for preparing a tetrafluoroethylene (hereinafter referred to as "TFE")/fluoro(alkyl vinyl ether) (hereinafter referred to as "FAVE") copolymer. More particularly, it relates to a process for preparing TFE/FAVE copolymer by aqueous suspension polymerization of TFE and FAVE in the presence of a certain specific polymerization initiator.

For the preparation of a TFE/FAVE copolymer, there are known solution and emulsion polymerizations. For example, the solution polymerization of TFE and FAVE in 1,1,2-trichloro-1,2,2-trifluoroethane is described in Japanese Patent Publication No. 2223/1973. In Japanese Patent Publication No. 41942/1973, it is proposed to carry out the solution polymerization of TFE and FAVE in perfluorosolvents, certain specific chlorofluoroalkanes or certain specific chlorofluorohydroalkanes in the presence of a hydrogen-containing chain transfer agent in order to minimize the formation of unstable terminal groups or tendency of expansion of the produced copolymer and further to improve its toughness.

In solution polymerization, as the polymerization proceeds, the viscosity of the solution increases so that the agitation of the polymerization system becomes harder, the produced copolymer is not dispersed well, and control of the heat of polymerization and homogeneous heating of the polymerization system become difficult. Therefore, the solution polymerization has drawbacks that the production efficiency is extremely low since the weight ratio of the produced copolymer to the solvent should be less than 0.2 and that it is not economical to use the expensive solvent in a large amount. In addition, when the weight ratio of the produced copolymer to the solvent is larger, component distribution in the molecule of the copolymer becomes heterogeneous and the physical properties, for example, toughness of the copolymer are deteriorated.

Alternatively, the emulsion polymerization of TFE and FAVE is described in, for example, Japanese Patent Publication No. 20788/1973. The emulsion polymerization should be carried out at a comparatively high temperature and the obtained copolymer often has unstable terminal groups. Further, it is troublesome to remove an emulsifier from the reaction mixture.

In the course of a study on the aqueous suspension polymerization of TFE and FAVE, it has been revealed that when di(perfluoroacyl)peroxides which are used in Examples of U.S. Pat. Nos. 3,528,954 and 3,642,742 are used as the polymerization initiators, they are hydrolyzed with water present in the polymerization system and their initiation efficiency is greatly deteriorated so that the polymerization rate is lowered. Further, the formation of the unstable terminal groups increases, and thus, volatiles are generated in a larger amount when the copolymer is heated.

As the result of further study, it has now been found that the aqueous suspension polymerization of TFE and FAVE can be carried out effectively by the use of certain specific polymerization initiators, and the drawbacks of the conventional process can be overcome.

According to the present invention, there is provided a process for preparing a TFE/FAVE copolymer comprising polymerizing TFE and FAVE in an aqueous suspension system which comprises a mixed medium of water and a fluorohydrocarbon or a chlorofluorohydrocarbon in a volume ratio of from 1:1 to 10:1 at a temperature of from 0° to 25° C. in the presence of a polymerization initiator of the formula:

$$[Cl(CF_2)_n\text{—COO}]_2 \quad \text{(I)}$$

wherein n is an integer of 1 to 10.

In the process of the invention, TFE and FAVE are polymerized in the aqueous suspension polymerization system. Therefore, the viscosity of the polymerization system does not increase appreciably, so that the produced copolymer is well dispersed in the system and the system can be easily stirred. The heat of polymerization is easily eliminated and the polymerization medium can be uniformly heated. The weight ratio of the produced copolymer to the solvent may be 0.4 or more, and the amount of the solvent to be used can be lowered. Further, the produced copolymer is easily recovered from the reaction mixture.

In addition, since the polymerization initiator (I) is used in the process of the invention, it is hardly hydrolyzed and can retain high initiation efficiency. The produced copolymer has a few unstable terminal groups such as carbonyl fluoride groups and generates a smaller volume of volatiles when heated. This means that the copolymer has less tendency to foam during molding than the conventional TFE/FAVE copolymers.

Since the initiator to be used according to the invention has high activity in a temperature range between 0° C. and 25° C., the polymerization can be carried out at a comparatively low temperature, and the formation of the unstable terminal groups tends to be lowered.

Generally, FAVE to be copolymerized with TFE in the process of the invention may be represented by the formula:

$$CF_2=CF-(O-CF_2CF)_a-O-(CF_2)_bCF_2X \quad \text{(II)}$$
$$\phantom{CF_2=CF-(O-CF_2}|\phantom{CF)_a-O-(CF_2)_bCF_2X}$$
$$\phantom{CF_2=CF-(O-CF_2}CF_3$$

wherein X is hydrogen or fluorine, a is an integer of 0 to 4, and b is an integer of 0 to 7. The specific examples of the compound (II) are perfluoro(methyl vinyl ether), perfluoro(ethyl vinyl ether), perfluoro(propyl vinyl ether), $$CF_2=CF-O-CF_2CF-O-CF_2CF_3,$$
$$\phantom{CF_2=CF-O-CF_2}|$$
$$\phantom{CF_2=CF-O-CF_2}CF_3$$

$$CF_2=CF-O-CF_2CF-O-(CF_2)_2CF_3,$$
$$\phantom{CF_2=CF-O-CF_2}|$$
$$\phantom{CF_2=CF-O-CF_2}CF_3$$

$$CF_2=CF-O-CF_2CF-O-(CF_2)_3CF_3,$$
$$\phantom{CF_2=CF-O-CF_2}|$$
$$\phantom{CF_2=CF-O-CF_2}CF_3$$

$$CF_2=CF-(O-CF_2CF)_2-O-CF_2CF_3,$$
$$\phantom{CF_2=CF-(O-CF_2}|$$
$$\phantom{CF_2=CF-(O-CF_2}CF_3$$

$$CF_2=CF-(O-CF_2CF)_2-O-(CF_2)_2CF_3,$$
$$\phantom{CF_2=CF-(O-CF_2}|$$
$$\phantom{CF_2=CF-(O-CF_2}CF_3$$

-continued

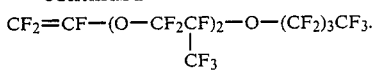

The weight ratio of TFE to FAVE is usually from 1:1 to 10:1.

The polymerization is usually carried out in a mixture of water and an organic solvent in a volume ratio of from 1:1 to 10:1, preferably from 1.5:1 to 5:1. When water is used in an amount less than the lower limit, the viscosity of the polymerization system rises and the stirring of the system becomes difficult, which result in the difficult control of polymerization temperature and nonhomogeneous heating of the medium. Thus, the productivity of the copolymer per unit volume of the medium tends to decrease. When water is used in an amount more than the upper limit, the amount of the produced polymer per unit volume of the polymerization system is lowered, which is not economical.

As the organic solvent, halogenated hydrocarbons, for example, fluorohydrocarbons and chlorofluorohydrocarbons are preferable. Their specific examples are 1,1,2-trichloro-1,2,2-trifluoroethane, 1,2-dichloro-1,1,2,2-tetrafluoroethane, trichlorofluoromethane, dichlorodifluoromethane, perfluorocyclobutane, etc.

Among the polymerization initiators, the compound (I) wherein n is an integer of 1 to 4, particularly 2 is preferable.

Since the initiator has high initiation efficiency at a comparatively low temperature as described above, the polymerization temperature in the process of the invention may be a temperature of from 0° to 25° C., preferably from 5° to 15° C. The reaction pressure may be from 0.5 to 15 Kg/cm²G, preferably from 1 to 10 Kg/cm²G.

In the process of the invention, a chain transfer agent may be added to the polymerization system in order to control the molecular weight of the copolymer. The specific examples of the chain transfer agent are alcohols (e.g. methanol, ethanol, etc.), ketones (e.g. acetone, etc.), ethers (e.g. dimethyl ether, diethyl ether, etc.), esters (e.g. methyl acetate, ethyl acetate, etc.) and halogenated hydrocarbons (e.g. carbon tetrachloride, chloroform, etc.). Among them, methanol and dimethyl ether are preferable.

The thus prepared copolymer may be recovered from the reaction mixture by a per se conventional method, for example, by removing the organic solvent and the unreacted monomers from the reaction mixture and isolating the copolymer from the mixture of water and the copolymer, for example, by filtration, evaporation, freeze drying, etc.

The present invention will be hereinafter explained further in detail by the following Examples, wherein parts and % are by weight unless otherwise indicated.

The melting point, specific melt viscosity, MIT flex life and volatile index of the copolymer produced in each Example are measured as follows:

Melting point

Perkin-Elmer DSC II type is used. A copolymer is heated from a room temperature at a rate of 10° C./min., and the peak value of the melting curve is assigned to a melting point.

Specific melt viscosity

A Koka-type flow tester is used. A copolymer is charged in a cylinder of 11.3 mm in inner diameter and kept at 380° C. for 5 minutes. Then, the copolymer is extruded from an orifice of 2.1 mm in inner diameter and 8 mm in length under piston load of 7 Kg. Specific melt viscosity is calculated by dividing 53,150 by the extrusion rate (g/min.).

MIT flex life

A standard type MIT fold endurance tester as described in ASTM D-1276-63 T is used. A copolymer film of about 90 mm in length, about 12.5 mm in width and about 0.2 mm in thickness is attached to the chucks of the tester and bent from side to side at an angle of 135° for each side under the load of 1.25 Kg at a rate of about 175 cycle/min. The bending cycles before the breakage of the film are recorded. The test is repeated twice and the results are averaged. The averaged cycles are defined as the MIT flex life.

Volatile index

A piece of a copolymer film (10.0 g) is charged in a 45 ml volume glass bottle which is connected to a vacuum line. The bottle is evacuated to a pressure ($P_0$) of 2 mmHg on a manometer. When an equilibrium pressure is attained, the bottle is immersed in a salt bath kept at 380° C. The bottle is kept at the same temperature for 40 minutes and then a pressure in the bottle ($P_{40}$) is measured.

The volatile index is calculated according to the following equation:

$$\text{Volatile index} = \frac{P_{40} - P_0}{10} \times V$$

wherein V is a total volume (ml) of the volumes of the bottle and of the vacuum line.

EXAMPLE 1

In a glass made autoclave equipped with a stirrer, which can contain 1,000 parts of water, demineralized and deaerated pure water (260 parts) was charged. The autoclave was purged thoroughly with pure nitrogen and evacuated. Thereafter, 1,2-dichloro-1,1,2,2-tetrafluoroethane (hereinafter referred to as "R-114") (200 parts) and $CF_2=CFOC_3F_7$ (hereinafter referred to as "FVE") (10 parts) were injected. Then, the autoclave was pressurized with TFE to 2.9 Kg/cm²G at 15° C. under stirring. As soon as $[ClCF_2CF_2COO]_2$ (hereinafter referred to as "Initiator A") (0.8 part) was injected, the reaction was initiated. During the reaction period, TFE was injected repeatedly to increase the pressure to from 2.4 to 2.9 Kg/cm²G. After 23 minutes of the reaction, as a chain transfer agent, methanol (24 parts) was added to control the molecular weight of the copolymer. After the reaction was continued for 144 minutes, unreacted momonomers, R-114 and the polymer particles were recovered. The particles were washed with water by means of a mixer and dried at 120° C. for 16 hours to obtain the copolymer (81.9 parts). M.P. 306° C. Specific melt viscosity $7.6 \times 10^4$ poise. MIT flex life 193,620 cycles.

COMPARATIVE EXAMPLE 1

In the same manner as in Example 1 but charging no water, adding methanol (0.08 part) after 28 minutes of the reaction and continuing the reaction initiated for 108 minutes, the reaction was carried out to obtain the copolymer (78.3 parts). M.P. 308° C. Specific melt viscosity $7.7 \times 10^4$ poise. MIT flex life 37,870 cycles.

After about 90 minutes of the reaction, the dispersibility of the polymer in the reaction medium was rapidly deteriorated and the reaction mixture was not thoroughly agitated so that it was difficult to control the temperature of the reaction medium. After 108 minutes of the reaction, the temperature of the autoclave interior abruptly rose to 17.5° C. and the reaction was stopped.

The results of Example 1 and Comparative Example 1 are shown in Table 1.

TABLE 1

| | Water (parts) | R-114 (parts) | FVE (parts) | Initiator (parts) | Methanol (parts) | Temp. (°C.) | Pressure (Kg/cm$^2$G) | Reaction time (minutes) | Produced amount (parts) | Specific melt viscosity (poise × 10$^4$) | M.P. (°C.) | MIT flex life (cycles) |
|---|---|---|---|---|---|---|---|---|---|---|---|---|
| Example 1 | 260 | 200 | 10 | A(0.8) | 24 | 15 | 2.9–2.4 | 144 | 81.9 | 7.6 | 306 | 193,620 |
| Comparative Example 1 | 0 | 200 | 10 | A(0.8) | 0.08 | 15 | 2.9–2.4 | 108 | 78.3 | 7.7 | 308 | 37,870 |

From the results as shown in Table 1, it is understood that when the produced amounts of the copolymers per unit volume of the solvent R-114 were the same, the viscosity of the reaction mixture in Comparative Example 1 rose higher and control of the reaction temperature was more difficult than in Example 1. Further, MIT flex life of the copolymer obtained in Comparative Example 1 was inferior to that of the copolymer obtained in Example 1 and its toughness was greatly deteriorated.

Hydrolysis of initiators

Figure 2:
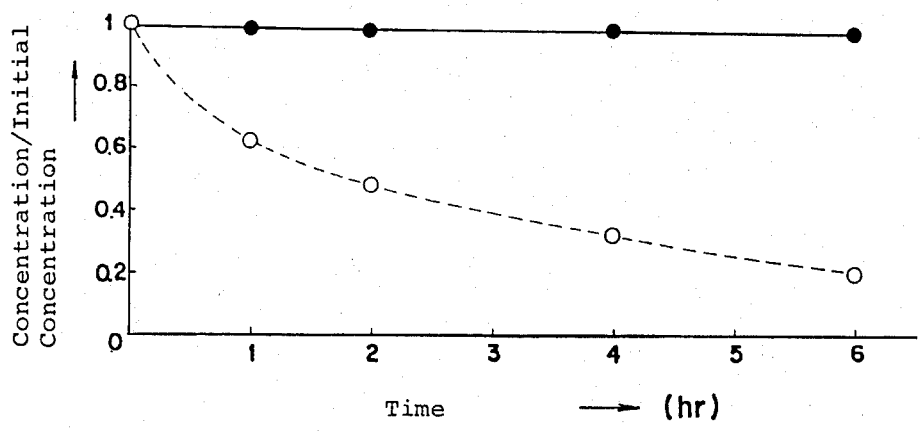

In a glass made autoclave equipped with a stirrer, as a liquid medium, 1,1,2-trichloro-1,2,2-trifluoroethane (hereinafter referred to as "R-113") (270 ml) (hereinafter referred to as "R-113 system") or a mixture of water (270 ml) and R-113 (270 ml) (hereinafter referred to as "R-113/water mixture system") was charged and a temperature was adjusted to 15° C. under stirring. After the temperature was stabilized, Initiator A or [CF$_3$CF$_2$COO$\frac{1}{2}$ (hereinafter referred to as "Initiator B") (each 15 g) was charged. At predetermined intervals, samples of the solution (each 1 ml) were taken out from the autoclave interior, and the concentration of the initiator was measured by iodometry. Ratio of the concentration of the initiator at each interval to the initial concentration was calculated. The results are depicted in FIGS. 1 and 2 wherein ● represents the results in the R-113 system and ○ represents the results in the R-113/water mixture system. FIG. 1 shows the results for Initiator A and FIG. 2 shows those for Initiator B.

As understood from the results shown in FIGS. 1 and 2, Initiator A showed little difference in concentration change between the R-113 system and the R-113/water mixture system, while Initiator B showed great concentration decrease in the R-113/water mixture system. Namely, Initiator A is not hydrolyzed with water, but Initiator B tends to be hydrolyzed with water.

EXAMPLE 2

In the same manner as in Example 1 but charging 360 parts of water, adding methanol after 35 minutes of the reaction and continuing the reaction initiated for 198 minutes, the reaction was carried out to obtain the copolymer (84.7 parts). M.P. 307° C. Specific melt viscosity 34 × 10$^4$ poise. Volatile index 90.

EXAMPLE 3

In the same manner as in Example 1 but charging 360 parts of water, adding methanol (48 parts) after 25 minutes of the reaction and continuing the reaction initiated for 266 minutes, the reaction was carried out to obtain the copolymer (83.3 parts). M.P. 307° C. Specific melt viscosity 10.4 × 10$^4$ poise. Volatile index 97.

COMPARATIVE EXAMPLE 2

In the same manner as in Example 1 but using Initiator B (4.8 parts) in place of Initiator A and continuing the reaction initiated for 387 minutes, the reaction was carried out to obtain the copolymer (82.4 parts). M.P. 307° C. Specific melt viscosity 16.5 × 10$^4$ poise. Volatile index 130.

The results of Examples 2 and 3 and Comparative Example 2 are summarized in Table 2.

TABLE 2

| | Water (parts) | R-114 (parts) | FVE (parts) | Initiator (parts) | Methanol (parts) | Temp. (°C.) | Pressure (Kg/cm$^2$G) | Reaction time (minutes) | Produced amount (parts) | Specific melt viscosity (poise × 10$^4$) | M.P. (°C.) | Volatile index |
|---|---|---|---|---|---|---|---|---|---|---|---|---|
| Example 2 | 360 | 200 | 10 | A(0.8) | 24 | 15 | 2.9–2.4 | 198 | 84.7 | 34 | 307 | 90 |
| Example 3 | 360 | 200 | 10 | A(0.8) | 48 | 15 | 2.9–2.4 | 266 | 83.3 | 10.4 | 307 | 97 |
| Comparative Example 2 | 260 | 200 | 10 | B(4.8) | 24 | 15 | 2.9–2.4 | 387 | 82.4 | 16.5 | 307 | 130 |

From the results as shown in Table 2, it is understood that the conventional initiators such as Initiator B used in Comparative Example 2 has drawbacks such that it should be used in a larger amount and requires longer reaction time than the initiator to be used in Examples 2 and 3 according to the invention. It is also understood that the copolymers obtained in Examples 2 and 3 have smaller volatile index than that obtained in Comparative Example 2 and generate smaller volume of volatiles when heated.

COMPARATIVE EXAMPLE 3

In the same manner as in Example 1 but using 0.04 part of Initiator A to initiate the reaction and adding the same initiator (each 0.04 part) every 40 minutes, adding methanol (8 parts) after 15 minutes of the reaction and continuing the reaction at 40° C. under a pressure of from 6.0 to 5.5 Kg/cm$^2$G for 93 minutes, the reaction was carried out to obtain the copolymer (113.6 parts). M.P. 307° C. Specific melt viscosity 14 × 10$^4$ poise. Volatile index 118.

The results of Examples 2 and 3 and Comparative Example 3 are summarized in Table 3.

TABLE 3

|  | Water (parts) | R-114 (parts) | FVE (parts) | Initiator (parts) | Methanol (parts) | Temp. (°C.) | Pressure (Kg/cm²G) | Reaction time (minutes) | Produced amount (parts) | Specifc melt viscosity (poise × 10⁴) | M.P. (°C.) | Volatile index |
|---|---|---|---|---|---|---|---|---|---|---|---|---|
| Example 2 | 360 | 200 | 10 | A(0.8) | 24 | 15 | 2.9–2.4 | 198 | 84.7 | 34 | 307 | 90 |
| Example 3 | 360 | 200 | 10 | A(0.8) | 48 | 15 | 2.9–2.4 | 266 | 83.3 | 10.4 | 307 | 97 |
| Comparative Example 3 | 260 | 200 | 10 | A(0.08) | 8 | 40 | 6.0–5.5 | 93 | 113.6 | 14 | 307 | 118 |

As understood from the results as shown in Table 3, in case of the polymerization utilizing the initiator according to the invention, the copolymers polymerized at 15° C. in Examples 2 and 3 have smaller volatile indexes than that polymerized at 40° C. in Comparative Example 3.

EXAMPLE 4

In the same manner as in Example 1 but using 8.0 parts of Initiator A, adding methanol (40 parts) after 24 minutes of the reaction and continuing the reaction at 5° C. under a pressure of from 2.0 to 1.5 Kg/cm²G for 170 minutes, the reaction was carried out to obtain the copolymer (83.1 parts). M.P. 309° C. Specific melt viscosity $3.6 \times 10^4$ poise.

EXAMPLE 5

In the same manner as in Example 1 but charging 360 parts of water, adding methanol (48 parts) after 33 minutes of the reaction and continuing the reaction initiated for 295 minutes, the reaction was carried out to obtain the copolymer (84.7 parts). M.P. 307° C. Specific melt viscosity $11.8 \times 10^4$ poise.

EXAMPLE 6

In the same manner as in Example 1 but using 0.4 part of Initiator A, adding methanol after 21 minutes of the reaction and continuing the reaction at 25° C. under a pressure of from 4.0 to 3.5 Kg/cm²G for 114 minutes, the reaction was carried out to obtain the copolymer (82.3 parts). M.P. 307° C. Specific melt viscosity $4.2 \times 10^4$ poise.

EXAMPLE 7

In the same manner as in Example 1 but using dimethyl ether in place of methanol, pressurizing the system with TFE premixed with 0.2% of dimethyl ether and continuing the reaction initiated for 165 minutes, the reaction was carried out to obtain the copolymer (81.0 parts). M.P. 307° C. Specific melt viscosity $4.2 \times 10^4$ poise.

The results of Examples 4 to 7 are summarized in Table 4.

What is claimed is:

1. A process for preparing a tetrafluoroethylene/fluoro(alkyl vinyl ether) copolymer, comprising: polymerizing tetrafluoroethylene and fluoro(alkyl vinyl ether) selected from the group consisting of perfluoro(methyl vinyl ether), perfluoro(ethyl vinyl ether), perfluoro(propyl vinyl ether), $$CF_2=CF-O-CF_2CF(CF_3)-O-CF_2CF_3,$$

$$CF_2=CF-O-CF_2CF(CF_3)-O-(CF_2)_2CF_3,$$

$$CF_2=CF-O-CF_2CF(CF_3)-O-(CF_2)_3CF_3,$$

$$CF_2=CF-(O-CF_2CF(CF_3))_2-O-CF_2CF_3,$$

$$CF_2=CF-(O-CF_2CF(CF_3))_2-O-(CF_2)_2CF_3, \text{ and}$$

$$CF_2=CF-(O-CF_2CF(CF_3))_2-O-(CF_2)_3CF_3,$$

in an aqueous suspension system which comprises a mixed medium of water and a fluorohydrocarbon or a chlorofluorohydrocarbon in a volume ratio of from 1:1 to 10:1 at a temperature of from 0° to 25° C. in the presence of a polymerization initiator of the formula:

$$[Cl(CF_2)_n-COO]_2$$

wherein n is an integer of 1 to 10.

2. The process according to claim 1, wherein the polymerization initiator is a compound of the formula (I) wherein n is an integer of 1 to 4.

3. The process according to claim 1, wherein the polymerization initiator is a compound of the formula:

$$[ClCF_2CF_2COO]_2.$$

TABLE 4

|  | Water (parts) | R-114 (parts) | FVE (parts) | Initiator (parts) | Methanol (parts) | Temp. (°C.) | Pressure (Kg/cm²G) | Reaction time (minutes) | Produced amount (parts) | Specific melt viscosity (poise × 10⁴) | M.P. (°C.) |
|---|---|---|---|---|---|---|---|---|---|---|---|
| Example 4 | 260 | 200 | 10 | A(8.0) | 40 | 5 | 2.0–1.5 | 170 | 83.1 | 3.6 | 309 |
| Example 5 | 360 | 200 | 10 | A(0.8) | 48 | 15 | 2.9–2.4 | 295 | 84.7 | 11.8 | 307 |
| Example 6 | 260 | 200 | 10 | A(0.4) | 24 | 25 | 4.0–3.5 | 114 | 82.3 | 5.8 | — |
| Example 7 | 260 | 200 | 10 | A(0.8) | (dimethyl ether) | 15 | 2.9–2.4 | 165 | 81.0 | 4.2 | 307 |

4. The process according to claim 1, wherein the weight ratio of tetrafluoroethylene and fluoro(alkyl vinyl ehter) is from 1:1 to 10:1.

5. The process according to claim 1, wherein the volume ratio of water and fluorohydrocarbon or chlorofluorohydrocarbon is from 1.5:1 to 5:1.

6. The process according to claim 1, wherein the fluorohydrocarbon or the chlorofluorohydrocarbon is selected from the group consisting of 1,1,2,-trichloro-1,2,2-trifluoroethane, 1,2-dichloro-1,1,2,2-tetrafluoroethane, trichlorofluoromethane, dichlorodifluoromethane and perfluorocyclobutane.

7. The process according to claim 1, wherein the reaction temperature is from 5° to 15° C.

8. The process according to claim 1, wherein the reaction pressure is from 0.5 to 15 kg/cm$^2$G.

9. The process according to claim 8, wherein the polymerization initiator is a compound of the formula (I) wherein n is an integer of 1 to 4.

10. The process according to claim 1, wherein the weight ratio of the produced copolymer to the solvent is 0.4 or more.

* * * * *